(12) United States Patent
Peeler et al.

(10) Patent No.: US 11,338,694 B1
(45) Date of Patent: May 24, 2022

(54) CHARGING STATION

(71) Applicant: Mod.al, Draper, UT (US)

(72) Inventors: Kreg Peeler, Draper, UT (US); Preston Ruff, Draper, UT (US); Erick Vega, Salt Lake City, UT (US); Bruce Cain, South Jordan, UT (US)

(73) Assignee: Mod.al, Draper, UT (US)

( * ) Notice: Subject to any disclaimer, the term of this patent is extended or adjusted under 35 U.S.C. 154(b) by 0 days.

(21) Appl. No.: 17/351,983

(22) Filed: Jun. 18, 2021

(51) Int. Cl.
*B60L 53/37* (2019.01)
*B60L 53/18* (2019.01)
*B60L 53/16* (2019.01)

(52) U.S. Cl.
CPC .............. *B60L 53/37* (2019.02); *B60L 53/16* (2019.02); *B60L 53/18* (2019.02)

(58) Field of Classification Search
CPC .................................. B60L 53/16; B60L 53/18
See application file for complete search history.

(56) References Cited

U.S. PATENT DOCUMENTS

| | | | |
|---|---|---|---|
| 2010/0134067 A1* | 6/2010 | Baxter | H02J 7/00036 320/109 |
| 2012/0286730 A1* | 11/2012 | Bonny | B60L 53/35 320/109 |
| 2021/0086639 A1* | 3/2021 | Rakuff | B60L 53/14 |

FOREIGN PATENT DOCUMENTS

DE   102011114321 A1 *  3/2013   ............. H02J 50/90

OTHER PUBLICATIONS

Machine translation of DE-102011114321-A1 (Year: 2021).*

* cited by examiner

*Primary Examiner* — David V Henze-Gongola
(74) *Attorney, Agent, or Firm* — Kirton McConkie; Brian Tucker

(57) ABSTRACT

A charging station can automatically and intelligently connect to and charge an electric vehicle's battery or otherwise provide power to a component of a vehicle. A charging station can be configured to detect the position of an onboard unit on a vehicle and automatically maneuver a receiver underneath the onboard unit. The charging station can then cause the onboard unit to extend and plug into the receiver. The charging station can then deliver power via the receiver and onboard unit.

20 Claims, 15 Drawing Sheets

1. Charging station 10 detects that EV 500 is approaching

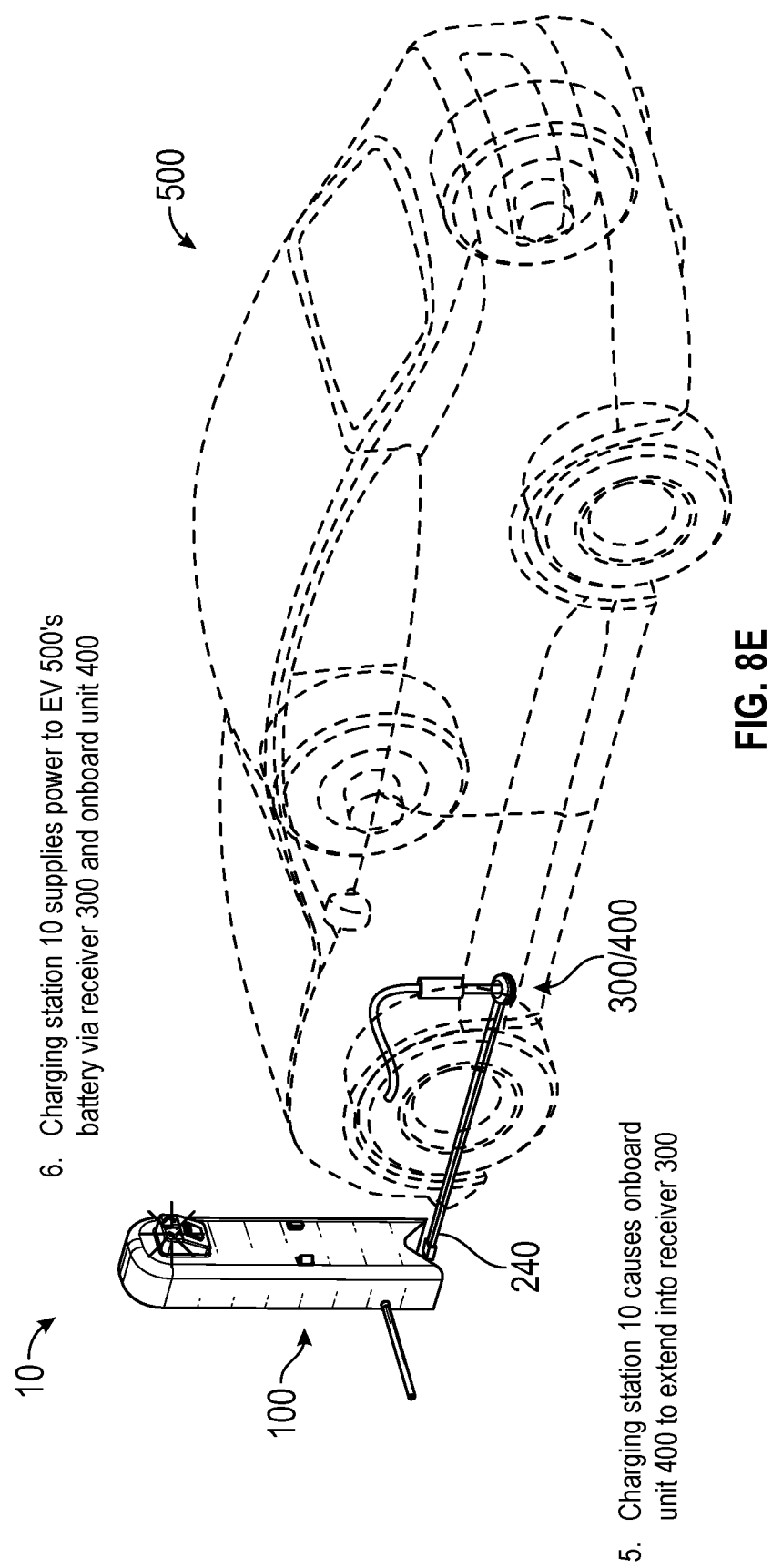

CHARGING STATION

CROSS-REFERENCE TO RELATED APPLICATIONS

N/A

BACKGROUND

Electrical vehicles (or EVs), whether cars, trucks or otherwise, must be frequently recharged. For this purpose, an EV typically has a charging port that is located on the side of the vehicle. In such cases, to charge the EV, a driver must exit the EV and plug a cord into the charging port.

Some attempts have been made to develop automated charging solutions. For example, some solutions employ a robotic arm that plugs the charging cord into the charging port. These solutions are bulky, expensive and obstruct the pathway around the EV. Other solutions employ induction to wirelessly charge the EV. Such solutions are complex and often require significant structural investments/modifications such as embedding an inductive plate in the concrete, asphalt or other base material. Wireless solutions are also incapable of performing level 3 "rapid" charging.

Because of such complexities, cost and limitations, automated charging solutions have not been widely adopted. Instead, the vast majority of EV owners simply plug in their EVs just like any other electronic device.

BRIEF SUMMARY

The present invention extends to a charging station that can automatically and intelligently connect to and charge an electric vehicle's battery or otherwise provide power to a component of a vehicle, and to corresponding systems, methods and computer program products. A charging station can be configured to detect the position of a vehicle as well as an onboard unit on the vehicle and automatically maneuver a receiver underneath the onboard unit. The charging station can then cause the onboard unit to extend and plug into the receiver. The charging station can then deliver power via the receiver and onboard unit to charge the vehicle's battery or otherwise provide power to a component of the vehicle.

In some embodiments, the present invention may be implemented as a charging station that includes a base unit, an extender and a receiver that is coupled to a distal end of the extender. The base unit may be configured to maneuver the extender to position the receiver under an electric vehicle.

In some embodiments, the charging station may further include a containment assembly housed within the base unit where the extender forms part of the containment assembly. In some embodiments, the containment assembly may pivot within the base unit to maneuver the extender.

In some embodiments, the containment assembly may include an extender assembly having an internal guide and a floor guide. In such embodiments, the extender may be maneuvered by sliding the extender within the internal guide and the floor guide to thereby extend the receiver from and retract the receiver towards the base unit. In some embodiments, the floor guide may route the extender from a vertical orientation into a horizontal orientation.

In some embodiments, the extender assembly may include power rails that extend along the internal guide, and the extender may include contacts that remain in contact with the power rails as the extender slides within the internal guide. In some embodiments, the extender assembly includes one or more cables positioned within the extender which connect the receiver to the power rails.

In some embodiments, the extender may be maneuvering by sliding the extender along the floor or ground.

In some embodiments, the extender may be a chain.

In some embodiments, the charging station may interface with an onboard unit that is electrically connected to a battery of the electric vehicle or a block heater of a diesel vehicle. In such cases, the extender may be maneuvered to position the receiver under the onboard unit. In some embodiments, the onboard unit may include a plug that inserts into the receiver. In some embodiments, the onboard unit may include telescoping members that cause the plug to insert into an opening in the receiver. In some embodiments, the opening may extend through the receiver.

In some embodiments, the base unit may include one or more sensors for detecting a position of the vehicle and one or more visual indicators for guiding a driver of the electric unit based on the detected position.

In some embodiments, the present invention may be implemented as a method for charging an electric vehicle. A receiver may be maneuvered along the floor or ground to position the receiver under an onboard unit that is electrically connected to an electric vehicle's battery. A plug of the onboard unit can then be extended downwardly to connect to the receiver. In some embodiments, the receiver may be connected to an extender and the receiver may be maneuvered by extending the extender from a base unit of a charging station. In some embodiments, the receiver may be maneuvered by pivoting a containment assembly from which the extender extends.

In some embodiments, the present invention may be implemented as a charging station that includes a base unit having a control system, a containment assembly housed in the base unit where the containment assembly includes an extender assembly having an extender, and a receiver connected to the extender. The control system may be configured to detect a position of an onboard unit that is connected to an electric vehicle's battery and to maneuver the extender to position the receiver below the onboard unit. In some embodiments, the control system can maneuver the extender by pivoting the containment assembly and/or extending the extender from the containment assembly. In some embodiments, the control system may cause a plug of the onboard unit to descend into an opening of the receiver to thereby electrically couple the onboard unit to the base unit.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 8A-8E provide an example of how a charging station that is configured in accordance with one or more embodiments of the present invention can automatically connect to and charge an electric vehicle's battery.

DETAILED DESCRIPTION

Embodiments of the present invention encompass charging stations that can automatically and intelligently connect to and charge an electric vehicle's (EV's) battery. A charging station configured in accordance with embodiments of the present invention can include a base unit that can maneuver a receiver underneath an EV to position the receiver below an onboard unit that is electrically connected to the EV's battery. The charging station can then cause the onboard unit to extend into the receiver to electrically couple the onboard unit to the receiver. The base unit can then supply power to the EV via the receiver and the onboard unit. In the specification and the claims, the phrase "electrically connected to an electric vehicle's battery" should be construed as encompassing direct and indirect connections. For example, an onboard unit may be electrically connected to an electric vehicle's batter via an onboard DC charger or a battery service panel.

Figure 1A:
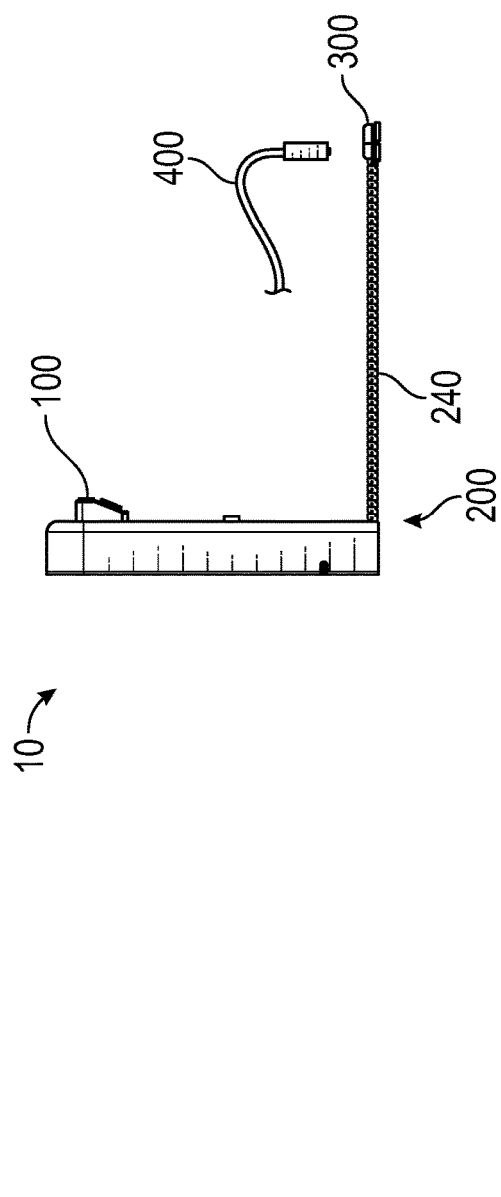
FIGS. 1A and 1B provide an example of a charging station that is configured in accordance with one or more embodiments of the present invention.
Figure 1B:
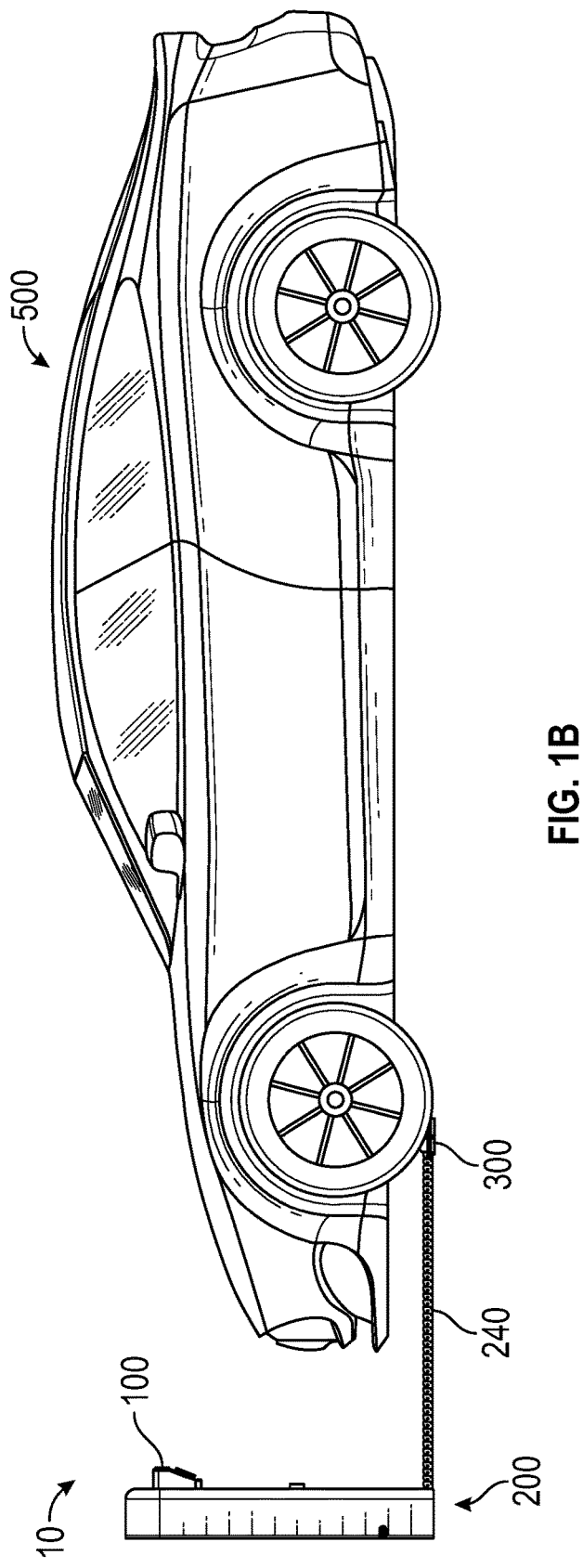

FIG. 1 provides an example of a charging station 10 that is configured in accordance with one or more embodiments of the present invention when charging station 10 is used to charge a battery of an EV 500. FIG. 1A shows charging station 10 without EV 500. Charging station 10 can include a base unit 100, a containment assembly 200, which is shown in FIGS. 3A-3E and includes an extender 240, and a receiver 300. An onboard unit 400 can be included on or added to EV 500 to enable EV 500 to be connected to charging station 10.

Figure 2B:
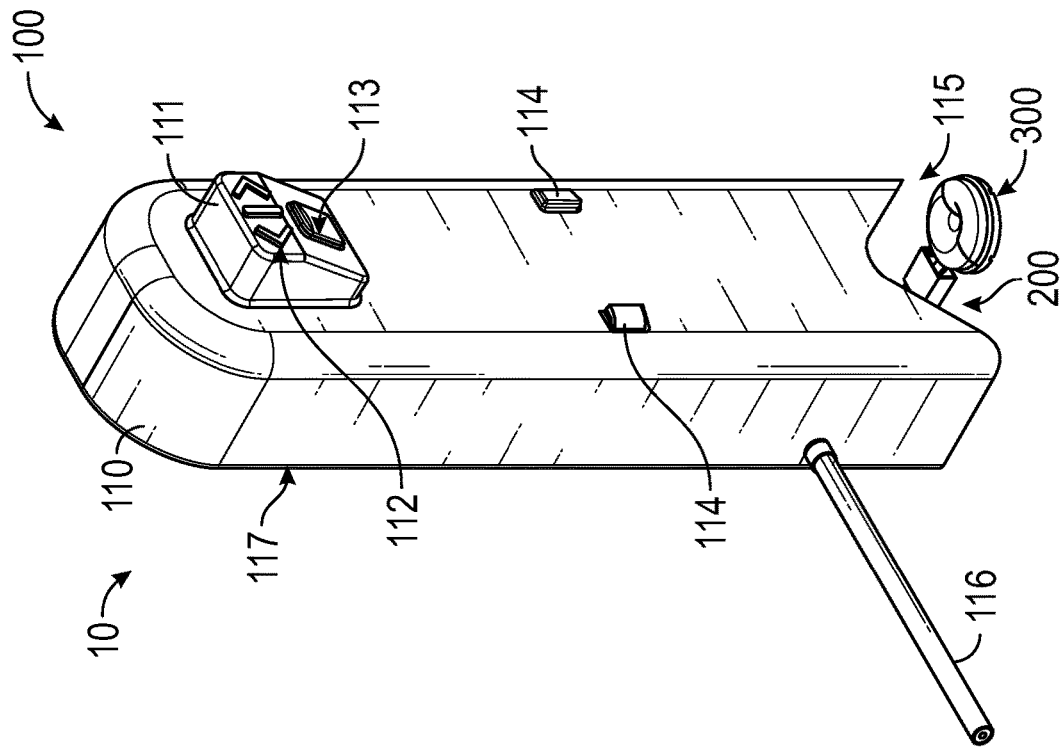
FIGS. 2A and 2B are front and front perspective views respectively of a base unit that may be used with a charging station that is configured in accordance with one or more embodiments of the present invention.
Figure 2A:
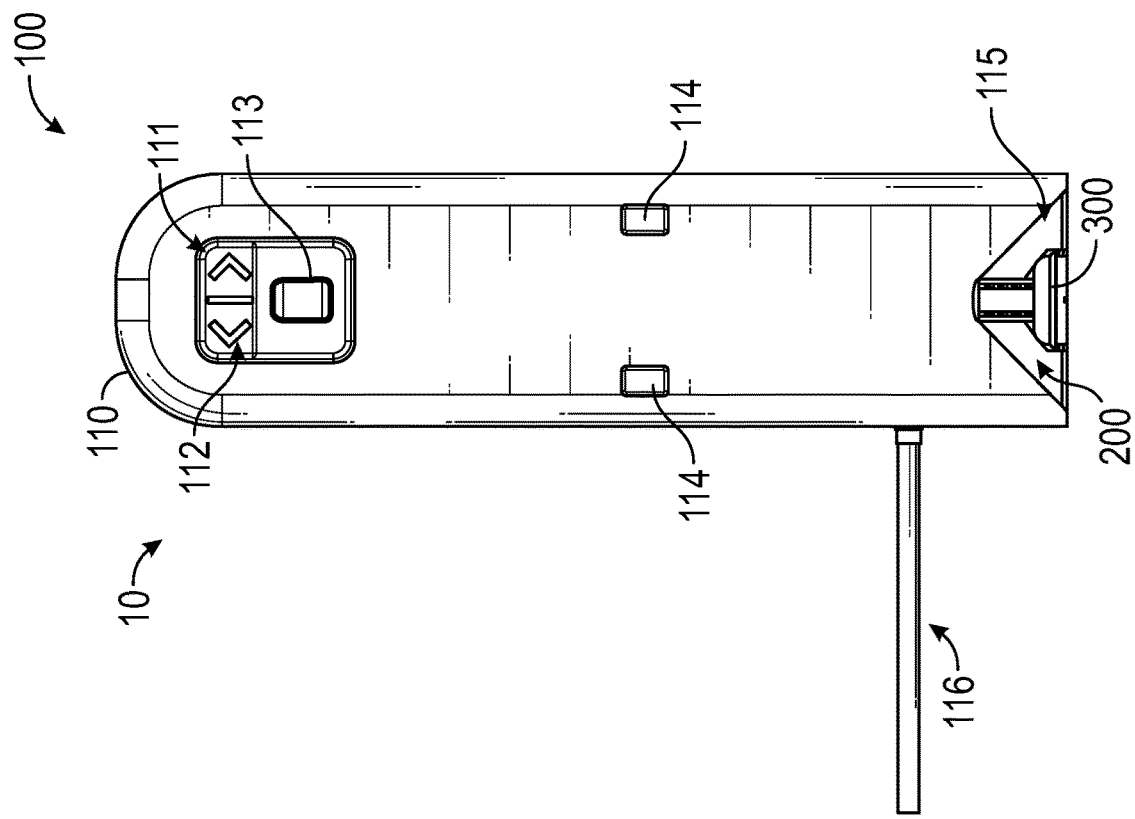

FIGS. 2A and 2B illustrate base unit 100 when extender 240 is retracted. Base unit 100 may include a housing 110 in which a containment assembly 200 is housed. In some embodiments, a back panel 117 may be separate from housing 110. In some embodiments, housing 110 may form a front compartment 111 in which one or more visual indicators 112 are disposed. In the depicted embodiment, visual indicators 112 include left and right arrows for guiding a driver of EV 500 as he or she approaches base unit 110 and a proper positioning indicator (e.g., a vertical green bar) for notifying the driver when EV 500 is properly positioned relative base unit 110. However, visual indicators 112 could be in any form capable of providing visual guidance to the driver. In some embodiments, base unit 100 may not include visual indicators 112 such as when charging station 10 is configured to interface with an autonomous EV for purposes of parking the EV in a proper position relative to base unit 100.

To enable base unit 110 (or more particularly, a control system of charging station 10) to provide visual guidance to the driver, base unit 110 may include one or more sensors. For example, in the depicted embodiment, an upper sensor 113 is positioned in front compartment 111 and is angled downwardly so that it will be oriented towards EV 500 as it approaches, while lower sensors 114 are positioned on opposing sides of base unit 110 and may be positioned to generally correspond with the height of EV 500's bumper. Based on signals from upper sensor 113 and/or lower sensors 114 (or any other suitable sensors), base unit 110 can determine whether EV 500 is too far to the right or left of base unit 100 and/or is near enough to base unit 100 and can activate visual indicators 112 accordingly. As described in detail below, although EV 500 need not be in a specific position to connect to base unit 100, visual indicators 112 can ensure that the driver positions EV 500 within the range of extender 240 (e.g., within the left and right boundaries of extender 240's pivoting range).

Base unit 100 may include a bottom opening 115 that may be frontwardly oriented and functions to enable extender 240 to be extended from and retracted into base unit 100 while extender 240 is on the floor (or ground). For example, once EV 500 is in proper position relative to base unit 100, extender 240 can be slid within bottom opening 115 and along the floor to position receiver 300 below onboard unit 400. In some embodiments, extender 240 can be fully retracted into base unit 100 so as to protect it from weather, human and animal interaction, damage, etc.

Base unit 100 may also receive a cable (or cord) 116 by which power is supplied to base unit 100. For example, when charging station 10 is installed in a private home, cable 116 could be plugged into a home's electrical system. Similarly, when charging station 10 is used at a business location, a gas station, a bus depot, a parking garage or any other location, cable 116 could represent base unit 100's connection to a power source. In addition to what is shown, cable 116 could extend into or connected to base unit 100 in any suitable way such as from beneath base unit 100.

FIGS. 3A-3E show base unit 100 with housing 110 removed. In some embodiments, back panel 117 can function to support containment assembly 200 in an upright orientation. However, containment assembly 200 could have a horizontal orientation or any other suitable orientation, and therefore, base unit 100 could have a variety of shapes and/or sizes for housing containment assembly 200.

In the depicted embodiment, an upper pivot bracket 118 is secured near the top of back panel 117 and a lower pivot bracket 119 is secured near the bottom of back panel 117. Containment assembly 200 may be supported between upper pivot bracket 118 and lower pivot bracket 119 to thereby enable containment assembly 200 to pivot back and forth. This pivoting allows receiver 300 to be slid side-to-side underneath EV 500 as necessary to position receiver 300 below onboard unit 400.

In some embodiments, containment assembly 200 may include a containment housing 201 on which a rotating gear 202 is mounted or coupled. In the depicted embodiment, rotating gear 202 is positioned on top of containment housing 201. In other embodiments, rotating gear 202 could be positioned on the bottom of containment housing 201, or rotating gears 202 could be positioned on both the top and the bottom of containment housing 201. Base unit 100 may include a motor 120 which drives a pivot drive gear 121 which in turn drives rotating gear 202 to cause containment assembly 200 to pivot. A control system of charging station 10 may control motor 120 as part of maneuvering receiver 300 into position below onboard unit 400.

Figure 3C:
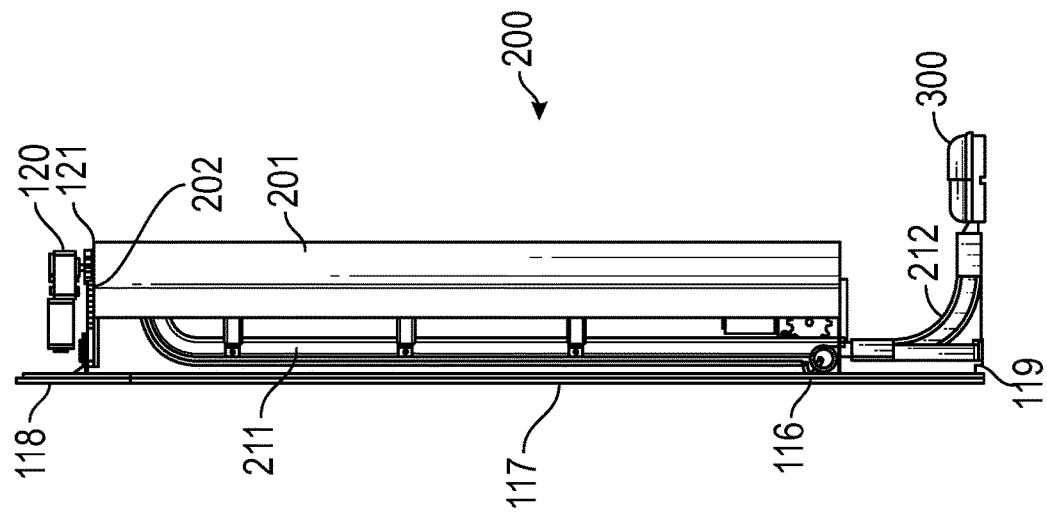
FIGS. 3A-3C are front, front perspective and side views respectively of the base unit with a housing removed thereby showing a containment assembly that may be used in a charging station that is configured in accordance with one or more embodiments of the present invention.
Figure 3B:
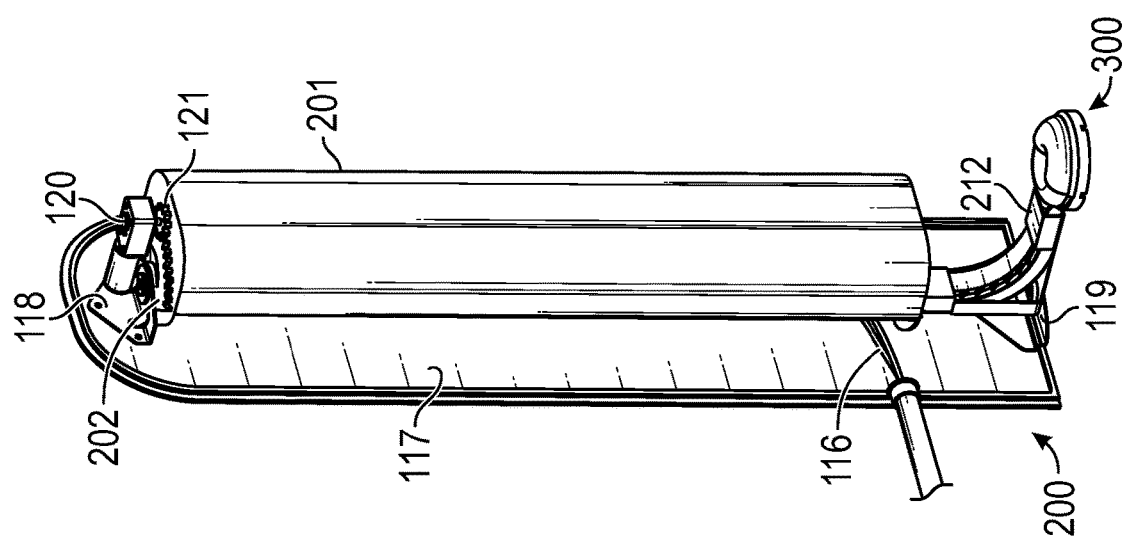
Figure 3A:
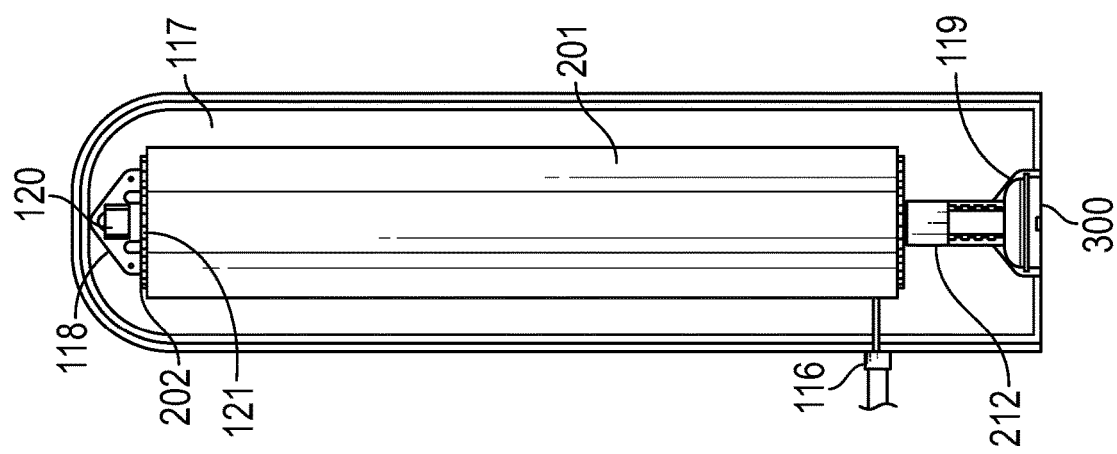
Figure 3D:
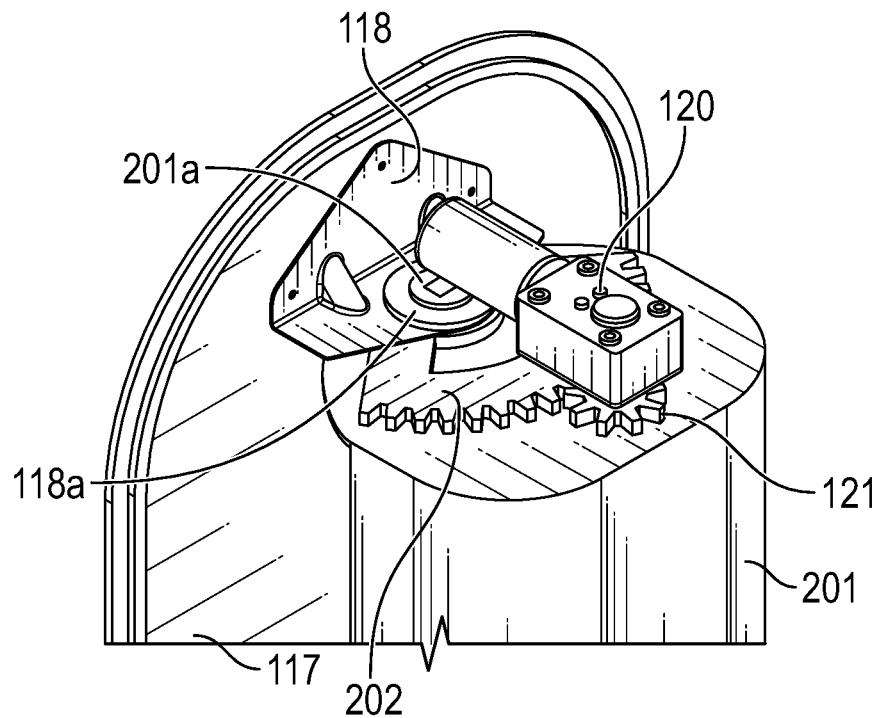
FIGS. 3D and 3E are detailed views of a top portion and a bottom portion respectively of the containment assembly.

As is best shown in FIG. 3D, the top surface of containment housing 201 may include a protrusion 201a that inserts through an opening 118a in upper pivot bracket 118 to secure containment assembly 200 to back panel 117. Protrusion 201a and opening 118a may be circular to enable containment housing 201, and therefore containment assembly 200, to rotate relative to upper pivot bracket 118. The axis of rotating gear 202 may be aligned with protrusion 201a.

Figure 3E:
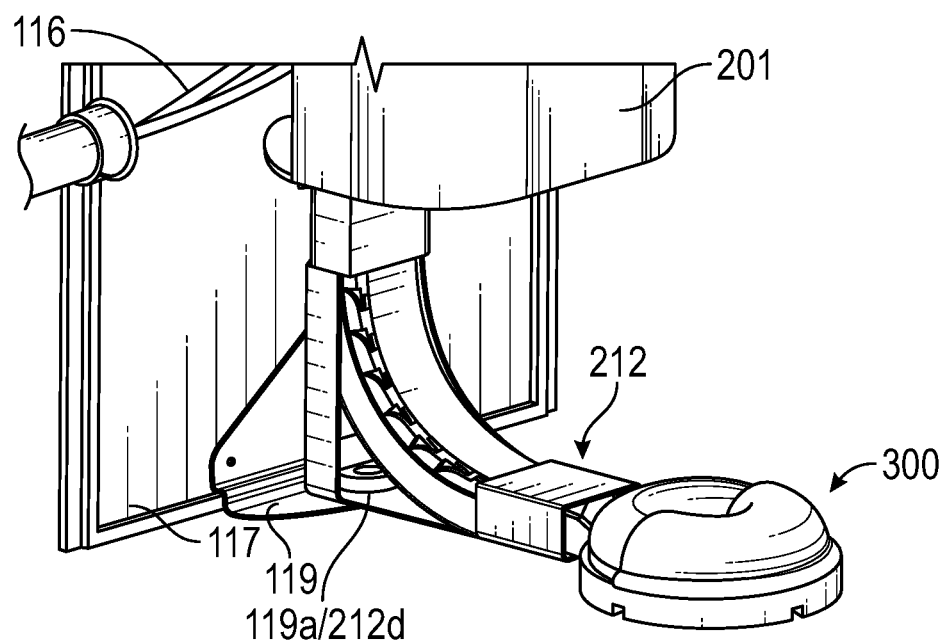

As best seen in FIG. 3E, a floor guide 212 of an extender assembly 210 may extend downwardly from containment housing 201 and may interface with lower pivot bracket 119 to secure containment assembly 200 to back panel 117. In the depicted embodiment, floor guide 212 includes a recess 212d into which a protrusion 119a of lower pivot bracket 119 inserts. Recess 212d and protrusion 119a can be circular to enable floor guide 212, and therefore containment assembly 200, to rotate relative to lower pivot bracket 119.

Figure 4C:
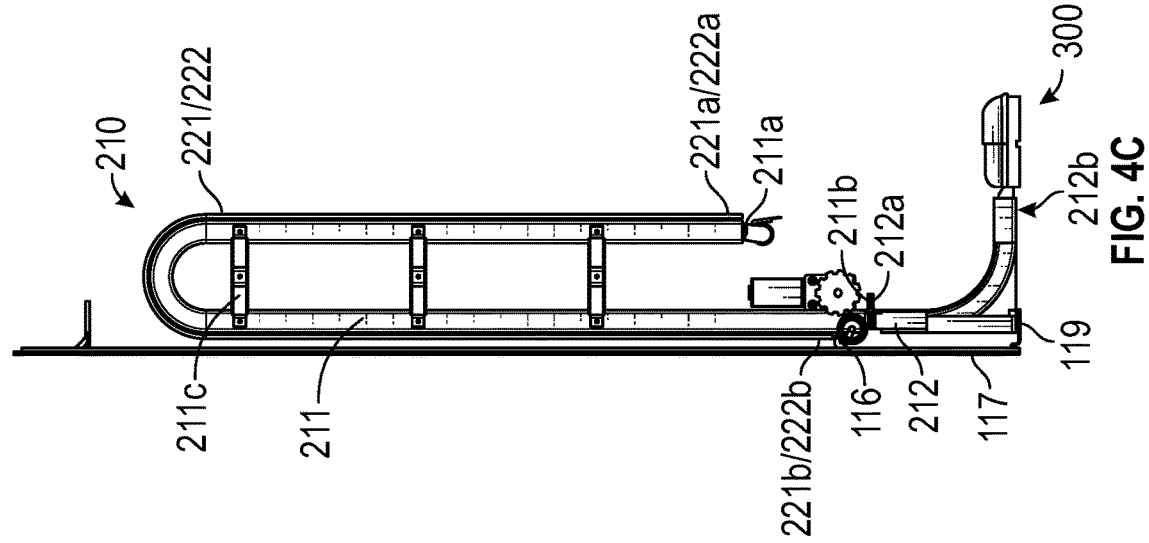
FIGS. 4A-4C are front, front perspective and side views respectively of the containment assembly with a containment housing removed thereby showing an extender assembly that may be used in a charging station that is configured in accordance with one or more embodiments of the present invention.
Figure 4B:
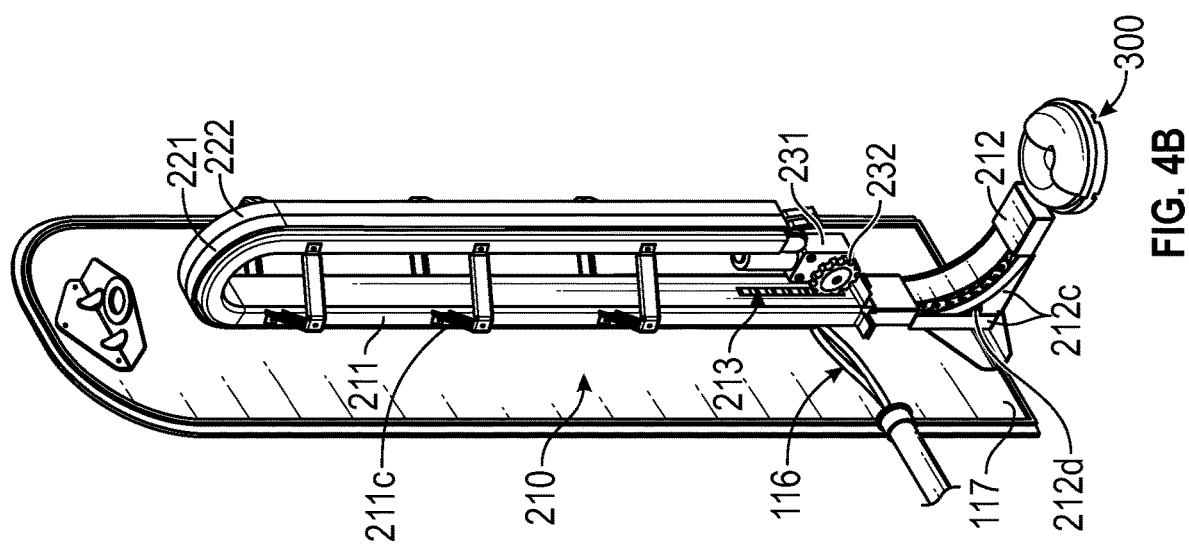
Figure 4A:
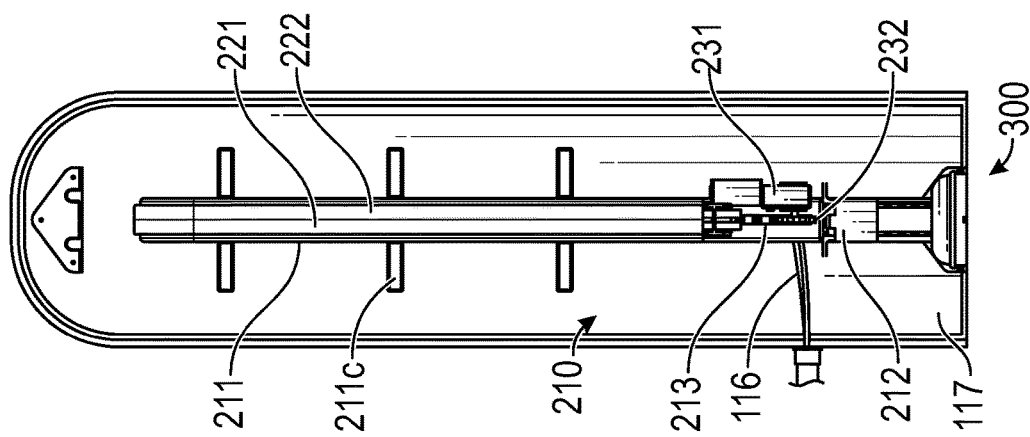

FIGS. 4A-4C show base unit 100 with housing 110 and containment housing 201 removed. As shown, extender assembly 210 can be substantially contained within containment housing 201. Extender assembly 210 can include an internal guide 211 and floor guide 212 which function as a guide for extender 240. Although internal guide 211 and floor guide 212 will be described as being two separate components, in some embodiments, these guides could be formed of a single component or more than two components. Accordingly, in some embodiments, floor guide 212 may be considered the portion of the guide for extender 240 which directs extender 240 onto the floor, and internal guide 211 can be considered the remaining portion of the guide for extender 240. To distinguish between opposite ends or components of extender assembly 210, the term "distal" will be used to reference the end of a component that is towards receiver 300 and the term "proximal" will be used to reference the opposite end.

Internal guide 211 and floor guide 212 can be hollow to form a pathway along which extender 240 may slide. In the depicted embodiment, internal guide 211 and floor guide 212 have a generally rectangular cross-sectional shape. This rectangular cross-sectional shape can facilitate the use of an extender 240 having a rectangular cross-sectional shape which in turn allows extender 240 to lie flat on the floor. However, internal guide 211 and floor guide 212 could have another cross-sectional shape such as a circular shape, an oval shape, a triangular shape, etc. which may accommodate an extender 240 having any suitable cross-sectional shape.

Floor guide 212 may have a curved shape to cause extender 240 to transition from a vertical orientation to a horizontal orientation. For example, a proximal end 212a of floor guide 212 may be vertically oriented alongside back panel 117 and a distal end 212b of floor guide 212 may be horizontally oriented to extend along the floor at or through bottom opening 115 of base unit 100. Accordingly, floor guide 212 may form a curved pathway for extender 240. To facilitate securing floor guide 212 to lower pivot bracket 119, floor guide 212 may include vertical and horizontal extensions 212c that form a corner at which recess 212d may be positioned.

Internal guide 211 may include a distal end 211b that is connected or positioned adjacent to proximal end 212a of floor guide 212. Distal end 211b may be downwardly oriented to align with proximal end 212a to enable extender 240 to slide therebetween. Internal guide 211 may extend upwardly and then curve overtop itself such that proximal end 211a of internal guide 211 is also downwardly oriented. Accordingly, internal guide 211 may have an inverted U shape. In some embodiments, one or more brackets 211c may be connected between the opposing lengths of internal guide 211 to prevent the opposing lengths from moving relative to one another and/or to provide support.

In some embodiments, internal guide 211 could be curved overtop itself more than once to facilitate the use of a longer extender 240. Also, in some embodiments, internal guide 211 need not be curved overtop itself. For example, if base unit 100 is sufficiently tall, internal guide 211 may consist of a single vertical length. In any case, curving internal guide 211 within base unit 100 can enable base unit 100 to be more compact while still enabling the use of an extender 240 with a length that is longer than the height or other dimension of base unit 100.

Extender 240 may be positioned within internal guide 211 and floor guide 212. To cause extender 240 to slide within internal guide 211 and floor guide 212, a motor 231 may be used to drive an extender drive gear 232 which in turn may interface with extender 240 to convert rotational motion into linear movement of extender 240. For example, in the depicted embodiments, an opening 213 is formed through internal guide 211. Extender drive gear 232 may extend through opening 213 to contact extender 240 so that, as extender drive gear 232 rotates, extender 240 will be extended from or retracted into floor guide 212. Motor 231 and extender drive gear 232 may be mounted to containment assembly 200 so that they pivot with containment assembly 200 and remain aligned with opening 213.

Extender assembly 210 may also include a pair of power rails 221, 222 that may extend along at least a portion of internal guide 211 and possibly along a portion of floor guide 212. In the depicted embodiment, proximal ends 221a, 222a of power rails 221, 222 extend to proximal end 211a of internal guide 211, and distal ends 221b, 222b of power rails 221, 222 extend towards distal end 211 of internal guide 211 where they may be connected to the individual wires/leads of cable 116.

Figure 5:
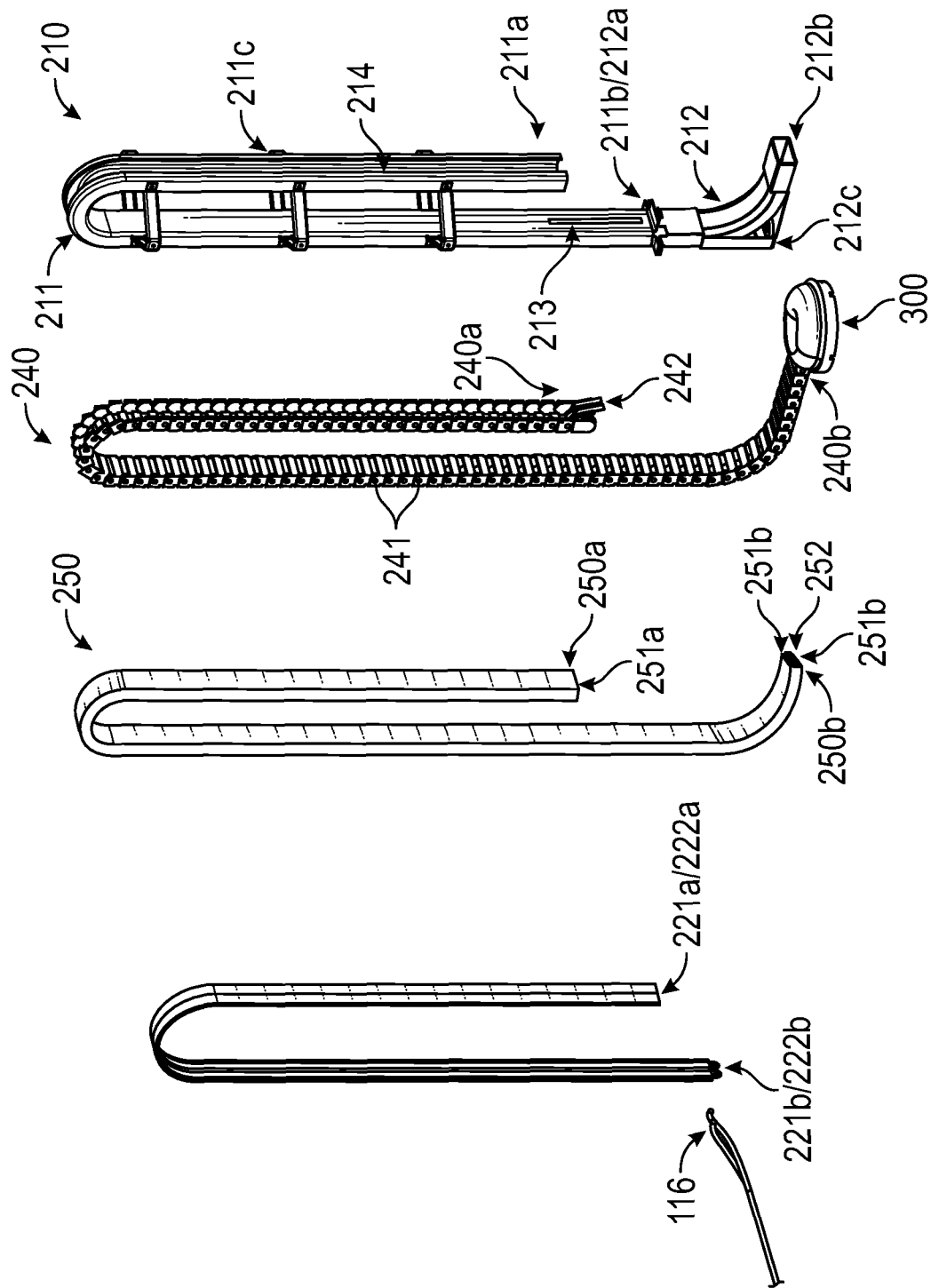
FIG. 5 is an exploded view of the extender assembly.
Figure 6B:
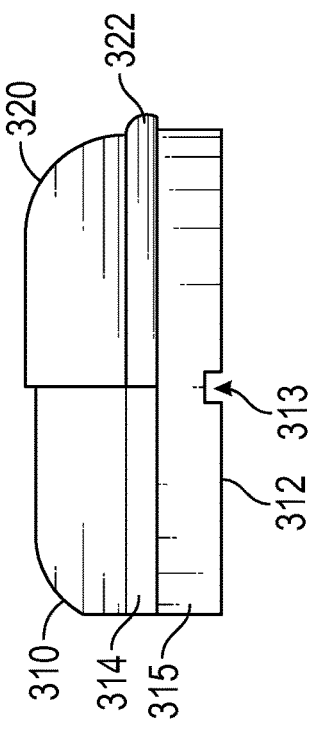
FIGS. 6A-6F are views of a receiver that may be used in a charging station that is configured in accordance with one or more embodiments of the present invention.
Figure 6D:
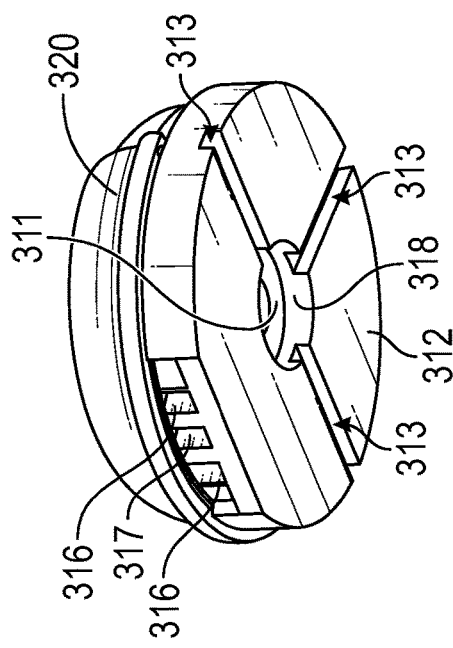
Figure 6A:
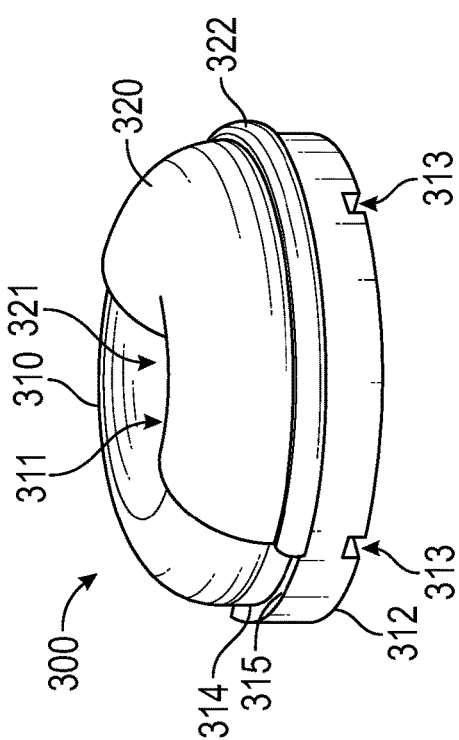
Figure 6C:
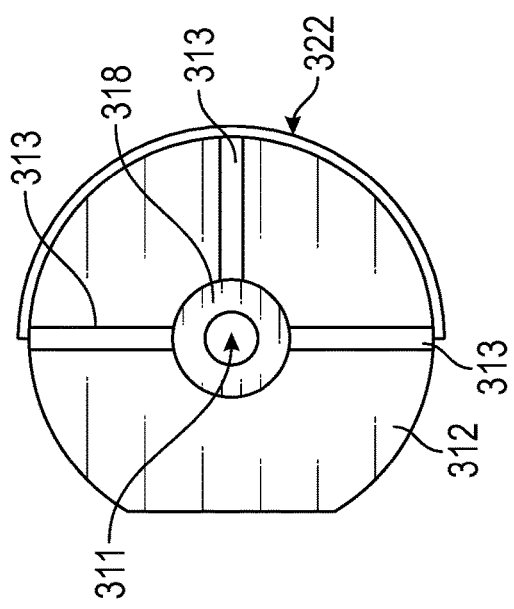
Figure 6E:
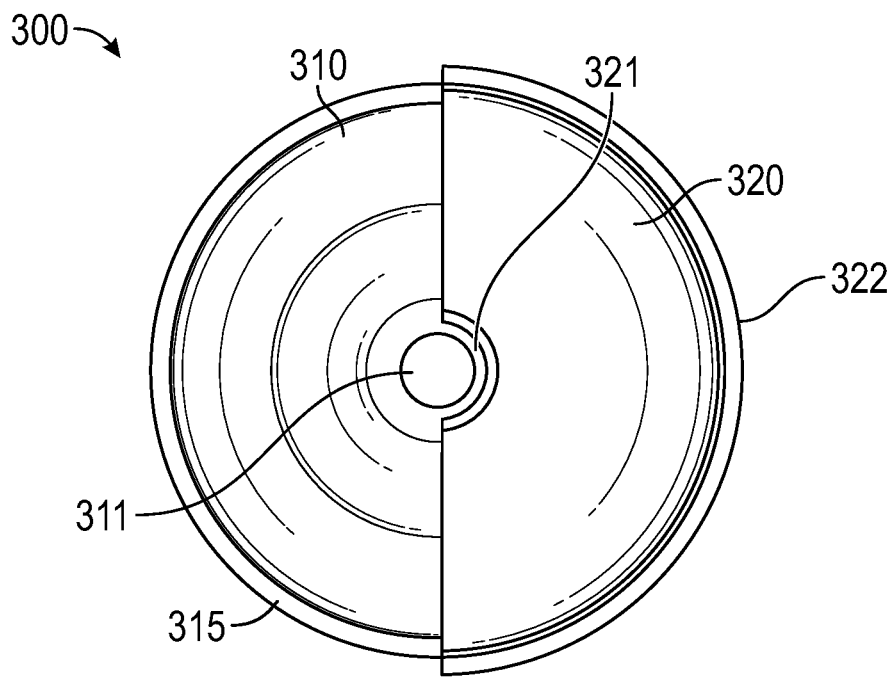
Figure 6F:
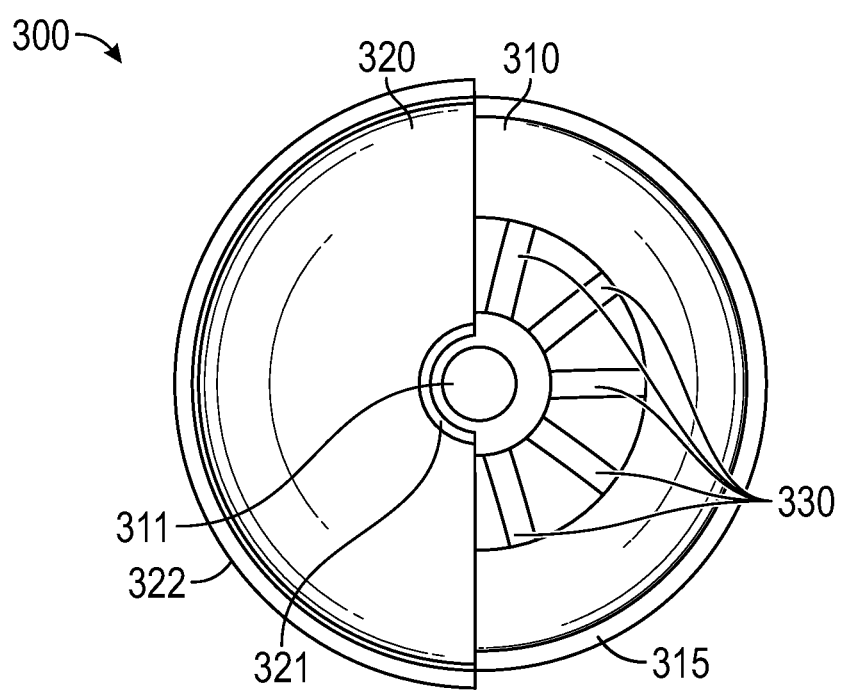
Figure 7C:
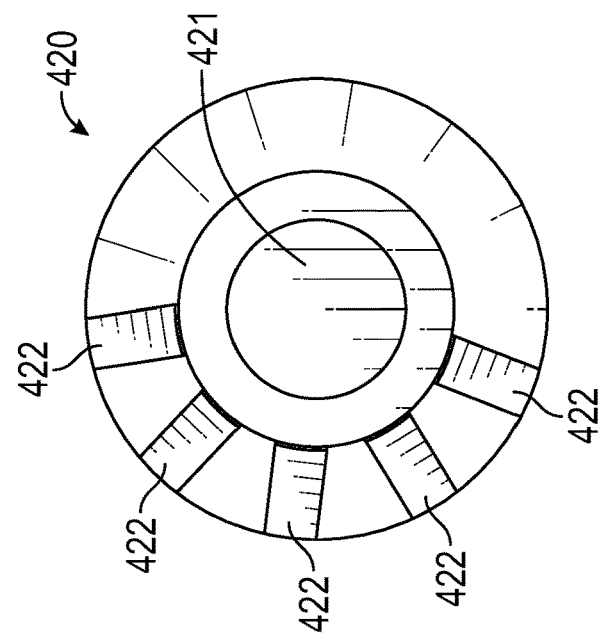
FIGS. 7A-7E are various views of an onboard unit that may be used with a charging station that is configured in accordance with one or more embodiments of the present invention.
Figure 7B:
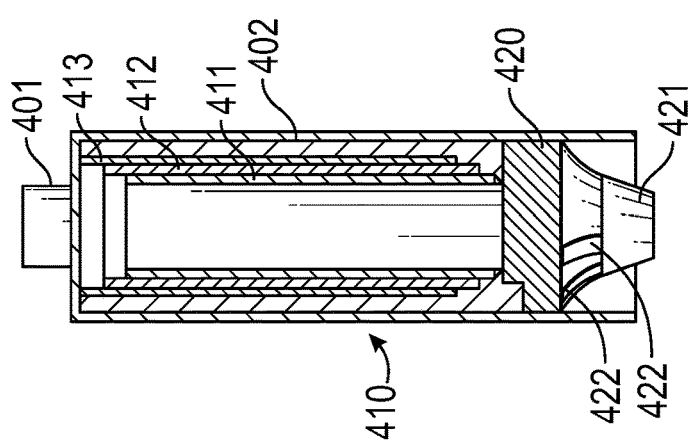
Figure 7A:
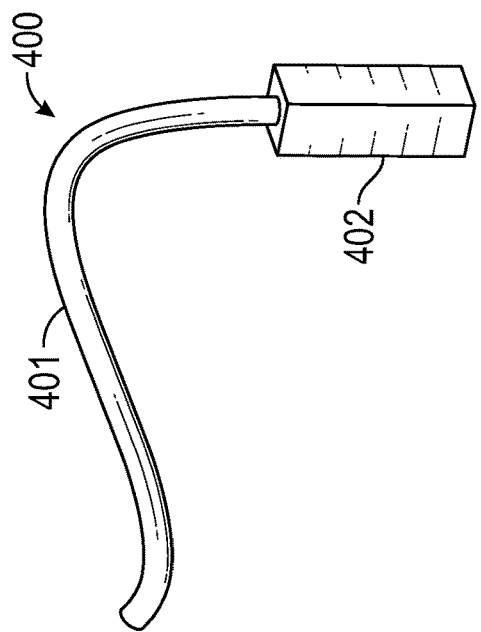
Figure 7D:
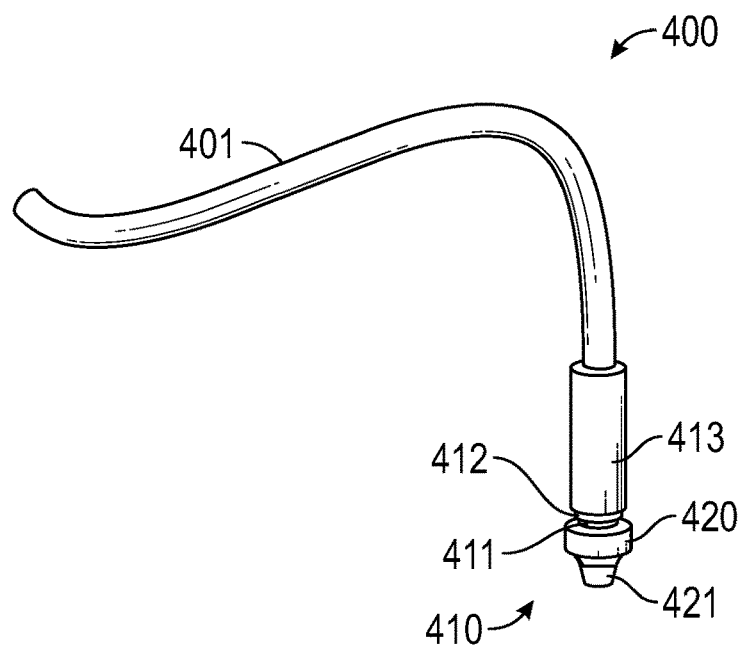
Figure 7E:
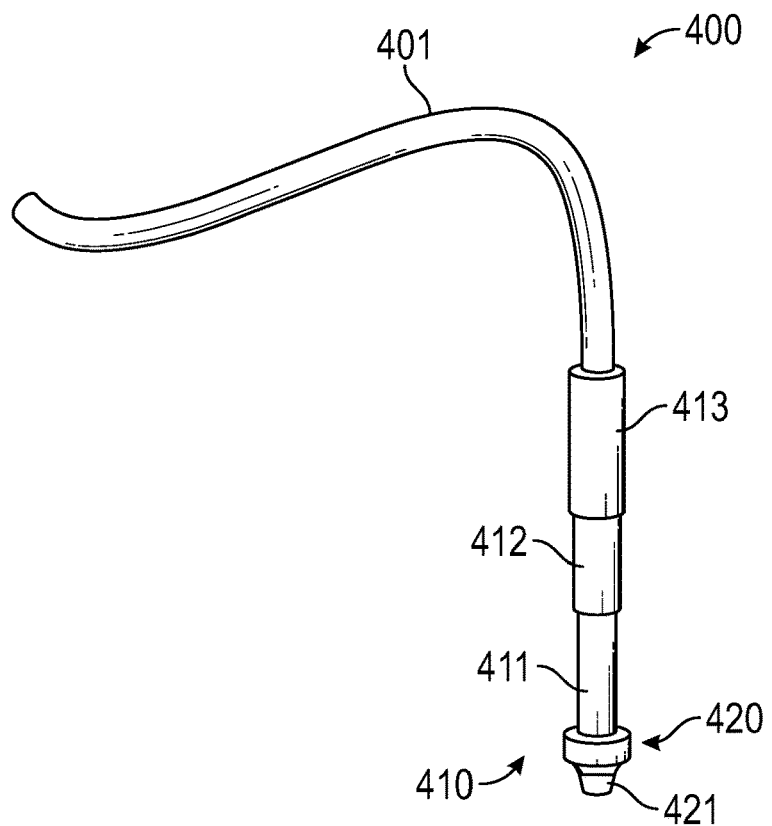

FIG. 5 provides an exploded view of extender assembly 210. As shown, a channel 214 may be formed along at least a portion of internal guide 211 and possibly along a portion of floor guide 212, and power rails 221, 222 may be positioned overtop channel 214. Power rails 221, 222 may include a conductive inner surface (e.g., copper plating) that is positioned within or faces channel 214. Extender 240 may include contacts 242 that extend out through channel 214 or otherwise contact the conductive inner surface of the respective power rails 221, 222. In the depicted embodiment, a pair of contacts 242 are formed at a proximal end 240a of extender 240. However, contacts 242 could be formed at other locations of extender 240. As extender 240 is slid within internal guide 211 and floor guide 212, contacts 242 can slide within channel 214 and remain in contact with power rails 221, 222. In this way, power supplied via cable 116 can be delivered to receiver 300 via extender 240 regardless of the extent to which receiver 300 may be extended from base unit 100.

In some embodiments, extender 240 may be formed of a plurality of interconnected articulating members 241. For example, articulating members 241 could be links of a chain. In some embodiments, articulating members 241 may have a rectangular shape so that they lie flat on the floor. However, articulating members 241 could have another suitable shape. Extender drive gear 232 may be configured to insert between articulating members 241 to extend and retract extender 240.

Extender assembly 210 may include a cable 250 that is configured to fit within extender 240. Cable 250 may provide a power connection between contacts 242 and receiver 300. For example, proximal ends 251a of wires can be electrically coupled to contacts 242 and distal ends 251b of wires can be electrically coupled to receiver 300. Although a single cable 250 is shown, in some embodiments, multiple cables 250 or wires could be used within extender 240.

In some embodiments, cable 250 may also provide a data connection between a control system of charging station 10 and receiver 300. For example, in FIG. 5, cable 250 is shown as having a data connector 252 at distal end 250b which can connect to a data port on receiver 300. Data connector 252 could be connected to the control system of charging station 10 in any suitable manner. For example, cable 250 could include a data cable. In other embodiments, however, the control system of charging station 10 and receiver 300 may be configured to communicate wirelessly, and in such embodiments, data connector 252 may not be needed.

FIGS. 6A-6F provide various views of receiver 300 and represent one suitable configuration of a receiver that could be used with a charging station that is configured in accordance with one or more embodiments of the present invention. Receiver 300 may include a housing 310 having an opening 311 that is vertically oriented and extends through housing 310. The top surface of housing 310 may be curved inwardly towards opening 311 such that housing 310 has a doughnut shape. A base 312 of housing 310 may be generally flat to facilitate sliding of receiver 300 along the floor.

One or more drain channels 313 may be formed in base 312 and may extend from opening 311 through the exterior wall of base 312. Drain channels 313 can enable water (or other fluids) that may enter opening 311 to flow out through base 312 rather than accumulate in opening 311. In some embodiments, a recess 318 may be formed in base 312 surrounding opening 311 to facilitate the flow of water into drain channels 313.

Receiver 300 may include a cover 320 that is configured to rotate around housing 301 to selectively expose contacts 330. Figure example, in FIG. 6E, cover 320 is positioned overtop contacts 330, whereas in FIG. 6F, cover 320 has been rotated to expose contacts 330. In some embodiments, cover 320 may have a semi-circular shape and may include a notch 321 that aligns with and surrounds opening 311. In some embodiments, base 312 may form a ridge 315 over which a lip 322 of cover 320 may be positioned. In some embodiments, housing 310 may include a guide channel 314 into which cover 320 inserts to thereby retain cover 320 on housing 310.

Housing 310 and cover 320 can be configured in a variety of ways to enable cover 320 to be selectively moved to expose contacts 330. For example, housing 310 and cover 320 may integrate magnets or magnetic materials, and receiver 300 may include circuitry that can selectively energize these magnets to rotate cover 320 to the desired position. In some embodiments, cover 320 may be mechanically biased into the position in which it covers contacts 330 and may be rotated in response to the creation of a magnetic field. In some embodiments, housing 310 and cover 320 may form a mechanical interface for moving cover 320. For example, a rotating arm could extend through channel 314 or ridge 315 to couple with cover 320.

Base 312 (or another portion of housing 310) can form power ports 316 and a data port 317 by which power and data are supplied to receiver 300. For example, distal ends 251b of wires (or corresponding connectors) in cable 250 could insert into power ports 316, while data connector 252 of cable 250 could insert into data port 317.

FIGS. 7A-7E provide various views of onboard unit 400 and represent one suitable configuration of an onboard unit that could be used with a charging station that is configured in accordance with one or more embodiments of the present invention. Onboard unit 400 can generally function as a mechanism for connecting EV 500's power system to receiver 300 to charge EV 500's battery, and in some embodiments, for connecting EV 500's control system to receiver 300 to enable charging station 10 and EV 500 to communicate.

Onboard unit 400 may include a cable 401 or other mechanism for connecting to EV 500's power system and a housing 402 in which a connection assembly 410 is disposed. Given that each EV may require a different mechanism for connecting to its power system, cable 401 should be viewed as representing a variety of mechanisms spanning a variety of EVs.

Connection assembly 410 includes a plug 420 having a tapered circular tip 421 on which contacts 422 are formed. Contacts 422 may correspond with contacts 330 of receiver 300, for example, in number, size, position, etc., so that they will contact each other when plug 420 is inserted into opening 311.

Plug 420 may be connected to housing 402 (or to cable 401) via a plurality of telescoping members 411-413. Although three telescoping members 411-413 are shown in the figures, any suitable number of telescoping members could be used. Telescoping members 411-413 enable plug 420 to be selectively extended from housing 402 to charge EV 500. For example, when the control system of charging station 10 has positioned receiver 300 below onboard unit 400, the control system can cause telescoping members 411-413 to extend downwardly to cause plug 420 to descend into opening 311. The control system may also cause housing 310 of receiver 300 to rotate (e.g., around base 312) to cause contacts 422 to be in alignment with contacts 330. Alternatively or additionally, the control system or circuitry of onboard unit 400 may cause plug 420 to be rotated, such as directly or via rotation of one or more of telescoping members 411-413, to cause contacts 422 to be in alignment with contacts 330.

Although not shown, in some embodiments, housing 402 may include one or more flaps that can selectively cover plug 420 when it is retracted into housing 402. For example, the flaps can be configured to open as telescoping members 411-413 are extended and to retract as telescoping members 411-413 are retracted. As another example, onboard unit 400 could include circuitry for detecting the presence of receiver 300 and could open the flaps when receiver 300 is present.

Figure 8A:
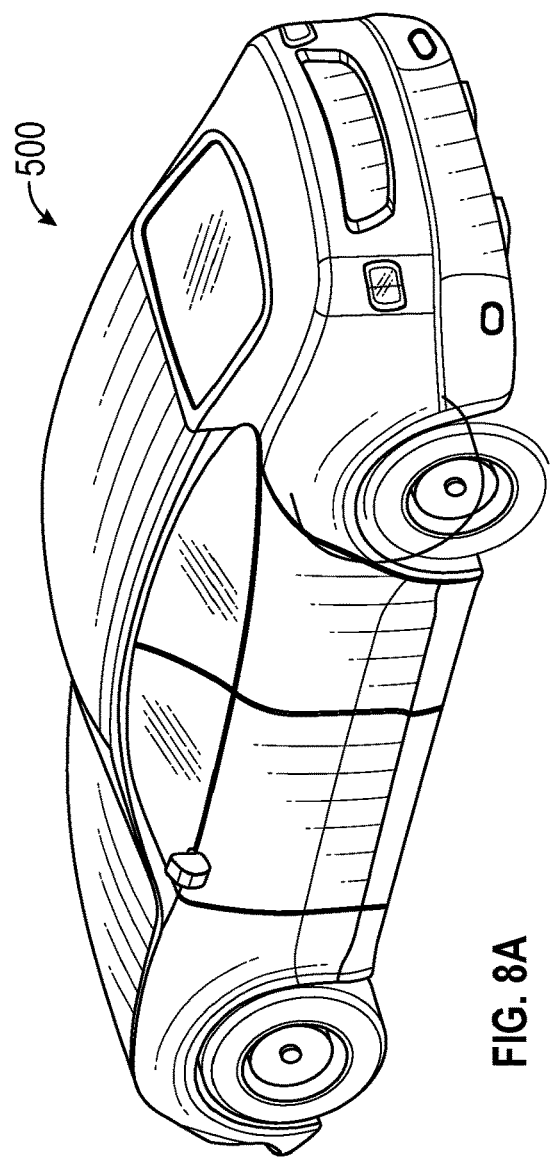
Figure 8A:
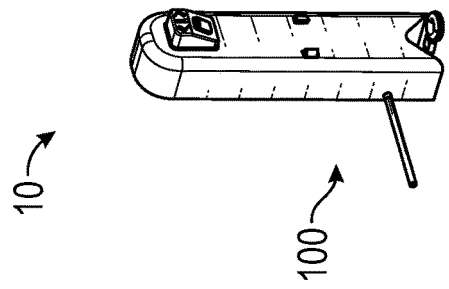

FIGS. 8A-8E provide an example of how charging station 10 can automatically connect to and charge EV 500's battery. In FIG. 8A, it is assumed that, in step 1, charging station 10 detects that EV 500 is approaching. For example, the control system of charging station 10 could employ upper sensor 113 and/or lower sensors 114 to detect the presence of EV 500, could receive a communication from onboard unit 400, could receive a communication from EV 500 or some other component or device, etc. In some embodiments, step 1 could entail identifying EV 500 or identifying the make/model of EV 500 to thereby determine where onboard unit 400 is located relative to the extents of EV 500 (e.g., on the driver side, on the passenger side, etc.).

Figure 8B:
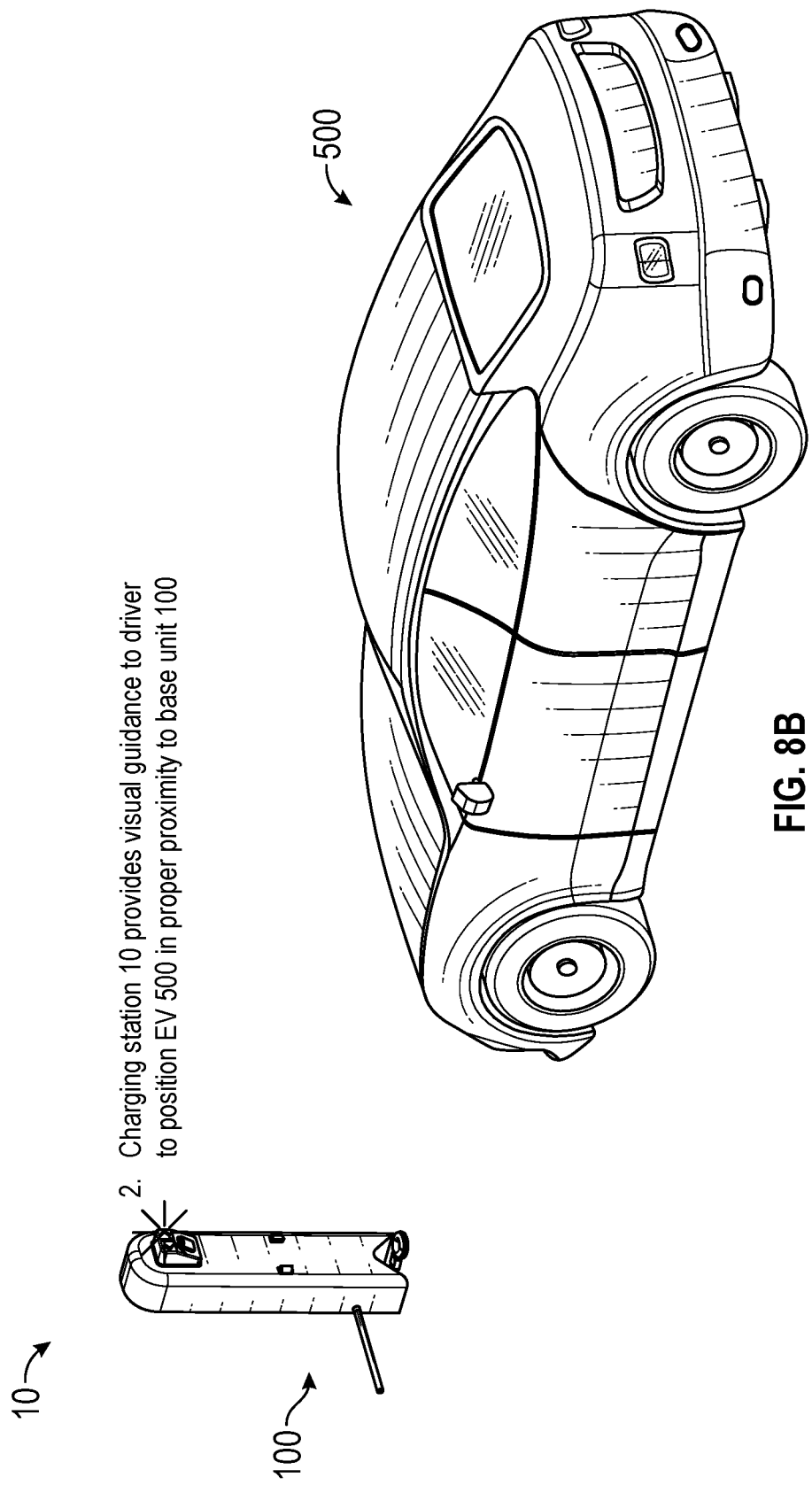

Turning to FIG. 8B, in step 2 and based on detecting the location of EV 500 relative to base station 10 as it approaches, the control system of charging station 10 could activate visual indicators 112 as appropriate to guide the driver in positioning EV 500 in proper proximity to base unit 100. For example, if the control system detects that onboard unit 400 is on the passenger side of EV 500, it could activate visual indicators 112 to guide the driver to park EV 500 with the passenger side towards base unit 100. In this way, the control system can ensure that the driver parks EV 500 so that onboard unit 400 is within the area in which receiver 300 can be maneuvered.

Figure 8C:
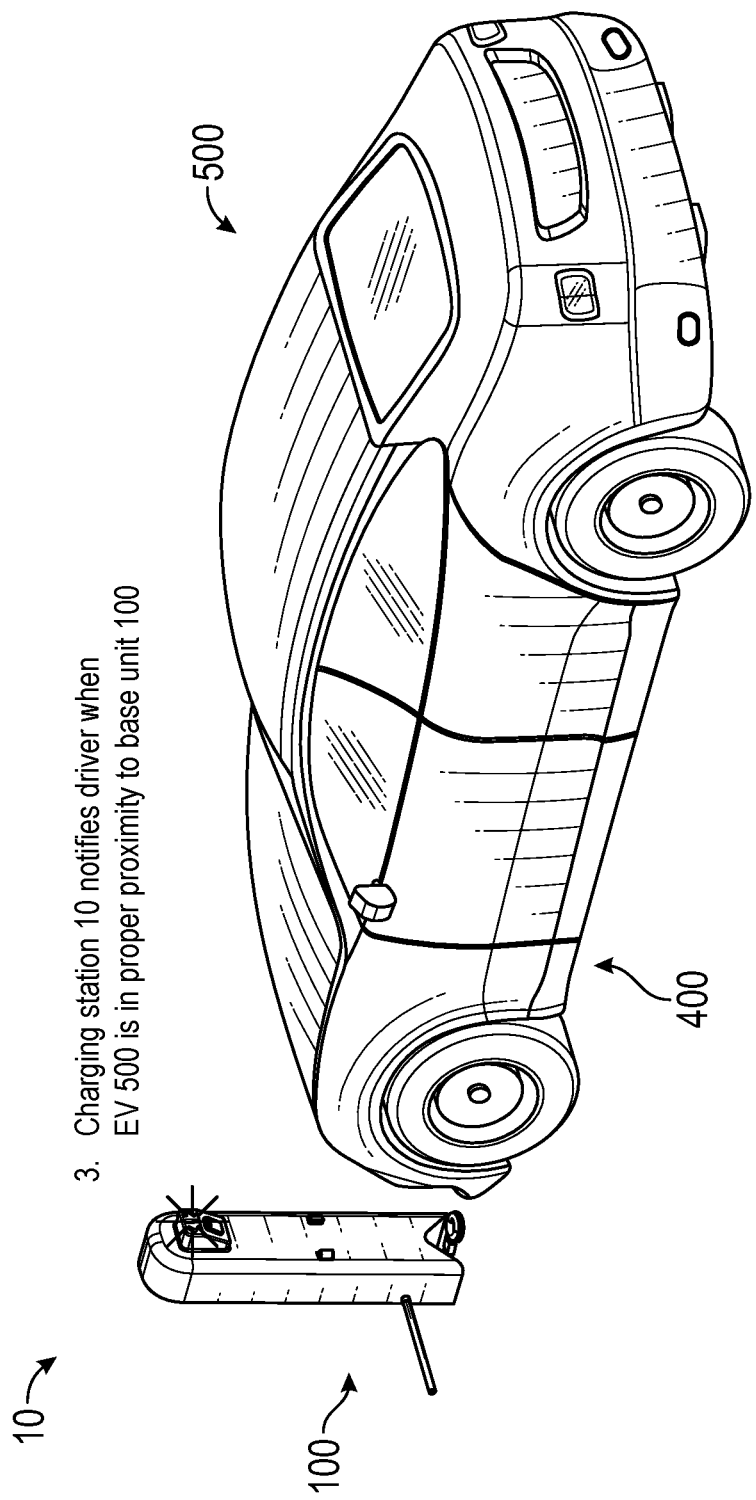

Turning to FIG. 8C, it is assumed that EV 500 has reached the proper position and therefore, in step 3, the control system of charging station 10 can notify the driver that EV 500 is in proper proximity to base unit 100. For example, the control system could activate visual indicators 112 to provide visual confirmation that the driver can park EV 500.

Figure 8D:
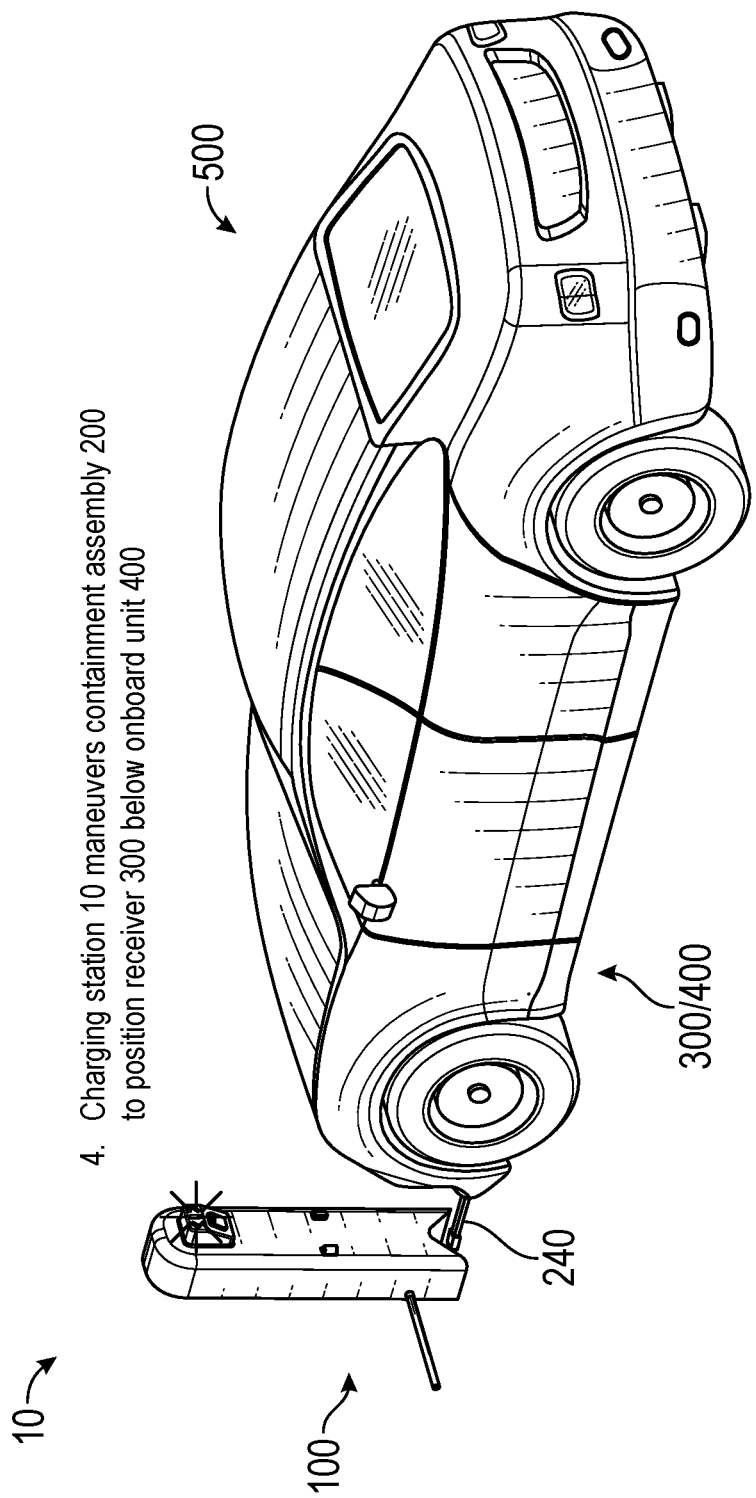

Turning to FIG. 8D, with EV 500 parked in proper proximity to base unit 100, in step 4, the control system of charging station 10 can maneuver containment assembly 200 to position receiver 300 below onboard unit 400. For example, the control system may drive motor 120 to pivot containment assembly 200 so that extender 240 is oriented towards onboard unit 400 and can drive motor 231 to extend extender 240 until receiver 300 is below onboard unit 400. In some embodiments, receiver 300 may include one or more sensors by which the control system can detect the position of onboard unit 400 relative to receiver 300 and use the detected position to perform this maneuvering.

Turning to FIG. 8E, with receiver 300 positioned below onboard unit 400, the control system of charging station 10 can cause onboard unit 400 to extend plug 420 down into opening 311. Because of the rounded shape of opening 311 and the tapered tip 421 of plug 420, if there is any misalignment between receiver 300 and onboard unit 400, tapered tip 421 can pull receiver 300 into alignment as plug 420 descends into opening 311. As described above, in conjunction with causing plug 420 to descend, the control system of charging station 10 can cause cover 320 to be rotated to expose contacts 330 and may rotate housing 310 and/or plug 420 as needed to align contacts 330 with contacts 422.

Once plug 420 has been inserted into opening 311 and contacts 422 are in contact with contacts 330, in step 6, the control system of charging station 10 may supply power to EV 500's battery via receiver 300 and onboard unit 400. For example, the control system can be configured to sense when proper connection of contacts 330 and 422 has occurred and can then begin supplying power. Although power could be supplied at any time before proper connection has been made, by waiting to supply power until plug 420 is properly positioned within opening 311, accidental shock or discharge can be prevented. Also, arcing can be prevented to thereby prolong the life of plug 420 and receiver 300

Notably, after parking EV 500, the driver need not take any additional action to cause EV 500's battery to be charged. Charging station 10 can automatically connect receiver 300 and onboard unit 400 and implement the charging process. Furthermore, in some embodiments, charging station 10 may be configured to communicate with EV 500's control system to autonomously drive EV 500 into the proper position relative to base unit 100. In such embodiments, no human involvement may be required at any point of the charging process.

In summary, a charging station configured in accordance with embodiments of the present invention can simplify the process of charging an EV by automatically connecting the EV's battery to a power source once the EV is parked within an area reachable by the receiver. As such, when using the charging station, the driver or autonomous functionality need not park the EV with precision. The ability of the receiver and the extender to be slid across the floor also allows the charging station to be used in virtually any location without any structural modifications to the floor. Accordingly, the charging station can be easily integrated into many different environments.

In some embodiments, a charging station may include more than one receiver to enable more than one vehicle to be connected to the charging station at any given time. For example, charging station 10 could include multiple extenders 240 to which multiple receivers 300 are connected. In such cases, charging station 10 could be configured to independently position each receiver 300 under an onboard unit 400 of multiple vehicles (e.g., vehicles parked on opposite sides of charging station 10. In some embodiments, charging station 10 could include multiple containment assemblies 200 for independently maneuvering the multiple extenders 240 and receivers 300. For example, a containment assembly 200 may be oriented to the left and another containment assembly 200 may be oriented to the right. Alternatively or additionally, a containment assembly may be oriented to the front and another containment assembly 200 may be oriented to the rear.

A charging station configured in accordance with embodiments of the present invention can also be used to provide power to a block heater of a diesel engine or to another component that may be designed to plug in to an external power source. For example, a suitably-configured onboard unit could be included on or integrated into a diesel vehicle (e.g., a car, pickup, semi, bus, etc.) and electrically connected to the block heater. Then, the diesel vehicle can be parked in proper proximity to the base unit of the charging station to enable the receiver to be maneuvered under the onboard unit and the onboard unit to be extended into the receiver. In such embodiments, the charging station can be configured to supply the appropriate voltage to the receiver to power the block heater (e.g., 110 volts).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A charging station comprising:
   a base unit;
   an extender assembly contained within the base unit, the extender assembly comprising a guide, an extender that is positioned within the guide, power rails that extend along the guide, and contacts that extend from the extender and contact the power rails as the extender slides within the guide; and
   a receiver that is coupled to a distal end of the extender, the receiver being configured to receive an onboard unit that is extended downwardly from a vehicle;
   wherein the base unit is configured to maneuver the extender to position the receiver under the vehicle to thereby enable the onboard unit to descend downwardly to insert into the receiver.

2. The charging station of claim 1, further comprising:
a containment assembly housed within the base unit, the containment assembly supporting the extender assembly.

3. The charging station of claim 2, wherein the containment assembly pivots within the base unit which causes the guide to pivot to thereby maneuver the extender.

4. The charging station of claim 2, wherein the guide comprises:
an internal guide; and
a floor guide;
wherein the internal guide forms a channel and the power rails extend along the channel, the contacts extending through the channel to contact the power rails.

5. The charging station of claim 4, wherein the floor guide routes the extender from a vertical orientation into a horizontal orientation.

6. The charging station of claim 4, wherein a distal end of the internal guide is downwardly oriented and couples to the floor guide, and the internal guide is curved overtop itself such that a proximal end of the internal guide is also downwardly oriented.

7. The charging station of claim 1, wherein the extender assembly includes one or more conductors positioned within the extender, the one or more conductors connecting the receiver to the power rails.

8. The charging station of claim 1, wherein maneuvering the extender comprises sliding the extender along a floor or ground.

9. The charging station of claim 1, further comprising:
one or more additional extenders to which one or more additional receivers are coupled;
wherein the base unit is further configured to maneuver the one or more additional extenders to position the one or more additional receivers under a vehicle.

10. The charging station of claim 1, wherein the vehicle is an electric vehicle and the onboard unit is electrically connected to a battery of the electric vehicle or the vehicle is a diesel vehicle and the onboard unit is connected to a block heater of the diesel vehicle;
wherein maneuvering the extender to position the receiver under the vehicle comprises maneuvering the extender to position the receiver under the onboard unit.

11. The charging station of claim 10, wherein the onboard unit comprises a plug that inserts into the receiver.

12. The charging station of claim 11, wherein the onboard unit includes telescoping members that cause the plug to insert into an opening in the receiver.

13. The charging station of claim 12, wherein the opening extends through the receiver.

14. The charging station of claim 1, wherein the base unit includes one or more sensors for detecting a position of the electric vehicle and one or more visual indicators for guiding a driver of the electric vehicle based on the detected position.

15. A charging station comprising:
a base unit having a control system;
a containment assembly housed in the base unit, the containment assembly comprising an extender assembly having a guide, an extender that is positioned within the guide, power rails that extend along a channel in the guide, and contacts that extend from the extender and through the channel to contact the power rails as the extender slides within the guide; and
a receiver connected to the extender, the receiver being configured to receive an onboard unit that is extended downwardly from a vehicle;
wherein the control system is configured to detect a position of the onboard unit that is connected to an electric vehicle's battery and to maneuver the extender to position the receiver below the onboard unit to thereby enable the onboard unit to be extended downwardly into the receiver.

16. The charging station of claim 15, wherein the control system maneuvers the extender:
pivoting the containment assembly; and
extending the extender from the guide.

17. The charging station of claim 15, wherein the control system is further configured to cause a plug of the onboard unit to descend into an opening of the receiver to thereby electrically couple the onboard unit to the base unit.

18. A charging station comprising:
a control system;
a base unit;
a containment assembly comprising a containment housing that is supported in the base unit and configured to pivot side to side, the containment assembly also comprising an extender assembly, the extender assembly including a floor guide, an internal guide, and an extender that extends through and slides within the internal guide and floor guide, the internal guide forming a channel along which power rails extend, the extender including contacts that extend through the channel and contact the power rails as the extender slides within the internal guide, the extender including conductors that are coupled to the contacts; and
a receiver that is coupled to a distal end of the extender, the receiver being coupled to the conductors to receive power for delivery to a vehicle.

19. The charging station of 18, wherein the base unit includes an upper pivot bracket and a lower pivot bracket, and the containment assembly is supported between the upper pivot bracket and the lower pivot bracket.

20. The charging station of claim 19, wherein the containment housing includes a rotating gear, and the base unit includes a motor that drives a pivot drive gear which in turn drives the rotating gear to thereby cause the containment housing to pivot side to side.

* * * * *